Patented Nov. 25, 1924.

1,516,917

UNITED STATES PATENT OFFICE.

PAUL THÉODORE FREUNDLER, OF PARIS, FRANCE.

PROCESS OF TREATING SEAWEED.

No Drawing. Application filed October 12, 1922. Serial No. 594,188.

*To all whom it may concern:*

Be it known that I, PAUL THÉODORE FREUNDLER, citizen of the Republic of France, and resident of Paris, in the said Republic, have invented a new and useful Process of Treating Seaweed, of which the following is a specification.

The process consists in successively heating the fresh seaweeds to a temperature of about 100 degrees centigrade, with saturated calcium bisulphite and with diluted sodium carbonate.

A. By the first treatment a bisulphitic solution is obtained containing iodine and a variety of fermentable organic products (sugars, gums, &c.)

B. By the second treatment there is obtained an alkaline solution containing algin and C. Cellulosic residue impregnated with a glutinating material (pectates).

Bisulphitic solution A.

To this solution a sufficient quantity of lime should be added, to precipitate the sulphurous acid in the state of lime sulphite. The liquor, after having been either filtered, strained, or poured from the top of the precipitate, is then treated by the usual processes in order to take out of it the iodine and and the fermentable organic products.

Alkaline solution B.

Whenever a discoloration has occurred, the alginic acid should be precipitated by a mineral acid, strained, washed and re-dissolved in ammonia. This ammonium solution is then evaporated or transformed into alginate of soda by the usual processes.

Cellulosic residue C.

This residue is centrifugalized, washed, dried, and molded or compressed. When dried it offers the appearance of a mass somewhat similar to ordinary paper pulp, very hard, non-hygroscopic, nonrotting, and may be used as a hydrofuge.

Advantages of the process.

1. Complete extraction of the main products contained in sea-weed.
2. Simple and economical treatment.
3. Not difficult to strain due to the hardness of the vegetable tissues resulting from the action of the bisulphite thereon.

Products.

The products vary somewhat according to the kind of sea-weeds.

For instance: 100 kg of Laminaria Flexicaulis (digitata) containing 25% of water, have yielded about:

| | Kg. |
|---|---|
| Iodine | .09 |
| Algin | 25 |
| Dry cellulosic paste | 10 |

Having now particularly described the nature of my invention and the manner in which the same is to be performed, I declare that what I claim is:

1. A process of treating sea-weed which consists in applying thereto a solution of calcium bisulphite, filtering the mass, applying to the residue a solution of sodium carbonate, centrifuging the insoluble mass, washing the mass, and finally drying the residue; whereby a cellulose substance containing properties of particular hardness is produced.

2. As an article of manufacture, the cellulose substance obtained by applying to seaweed a solution of calcium bisulphite, filtering the mass, applying to the residue a solution of sodium carbonate, centrifuging the insoluble mass, washing the mass, and finally drying the residue.

In testimony, that I claim the foregoing as my invention, I have signed my name 29th day of September, 1922.

PAUL THÉODORE FREUNDLER.